United States Patent [19]
Elliott-Moore

[11] Patent Number: 5,135,264
[45] Date of Patent: Aug. 4, 1992

[54] FLOW COUPLING WITH FRANGIBLE PRESSURE SENSITIVE HOLDING MEMBER TO ALLOW VENTING

[75] Inventor: Peter Elliott-Moore, Evesham, England

[73] Assignee: Meco Mining Equipment Limited, Tewkesbury, England

[21] Appl. No.: 715,135

[22] Filed: Jun. 14, 1991

[30] Foreign Application Priority Data

Jul. 25, 1990 [GB] United Kingdom ............... 9016279
Feb. 27, 1991 [GB] United Kingdom ............... 9104143

[51] Int. Cl.⁵ ............................................. F16L 37/14
[52] U.S. Cl. ........................................ 285/2; 285/924; 285/305; 405/302
[58] Field of Search ................. 285/1, 2, 3, 4, 305, 285/924; 405/302, 295, 296; 137/67, 68.1

[56] References Cited

U.S. PATENT DOCUMENTS

| 1,580,694 | 4/1926 | Smith | 285/924 |
|---|---|---|---|
| 2,772,898 | 12/1956 | Seeler | 285/924 |
| 2,839,315 | 6/1958 | Arterbury et al. | 285/3 |
| 3,453,005 | 7/1969 | Foults | 285/924 |
| 3,574,359 | 4/1971 | Klein | 285/924 |
| 3,603,333 | 9/1971 | Anderson | |
| 4,064,953 | 12/1977 | Collins | 285/2 |
| 4,082,104 | 4/1978 | Keeney | |
| 4,253,683 | 3/1981 | Jentson et al. | 285/924 |
| 4,452,472 | 6/1984 | Crase | 285/3 |
| 4,552,488 | 11/1985 | Elliott-Moore | 405/302 |
| 4,821,775 | 4/1989 | Cooksey | 137/67 |

FOREIGN PATENT DOCUMENTS

| 274713 | 7/1927 | United Kingdom . |
|---|---|---|
| 391829 | 5/1933 | United Kingdom . |
| 769064 | 2/1957 | United Kingdom . |
| 859441 | 1/1961 | United Kingdom . |
| 1368409 | 9/1974 | United Kingdom . |
| 1587513 | 4/1981 | United Kingdom . |
| 2095371 | 9/1982 | United Kingdom . |

Primary Examiner—Eric K. Nicholson
Attorney, Agent, or Firm—Young & Thompson

[57] ABSTRACT

A through flow coupler comprises two parts having intercommunicating passages therein so that fluid can flow through the two parts. A sealing member provides a fluid tight seal between the two parts when the two parts are held together in a sealed condition. A pressure sensitive device, which may comprise a frangible ring, holds the two parts in the sealed condition when the fluid pressure within the passages is below a certain value and allows the two parts to move relative to one another to a pressure relief condition so that fluid can escape from the passages when the fluid pressure within the passages exceeds said certain value. Also, mutually co-operable members, e.g. flanges, are provided to prevent total separation of the two parts when the pressure sensitive device allows the two parts to move relative to one another.

12 Claims, 1 Drawing Sheet

FLOW COUPLING WITH FRANGIBLE PRESSURE SENSITIVE HOLDING MEMBER TO ALLOW VENTING

INTRODUCTION

This invention relates to a through flow coupler which also operates as a pressure relief device.

It is known to use pressure relief devices, such as yield valves, in pneumatic and hydraulic circuits. Yield valves can be made to operate at precise pressures and are relatively expensive, particularly when a large number are required in an installation.

There are numerous circumstances in which the operating pressure of a pressure relief device is not critical and the present invention seeks to provide such a device which is cheaper to make than a conventional yield valve and which is incorporated in a through flow coupler.

SUMMARY OF THE INVENTION

According to one aspect of the invention, there is provided a through flow coupler comprising first and second parts having intercommunicating passage means so that fluid can flow through the first and second parts, sealing means for providing a fluid tight seal between the first and second parts when the first and second parts are held in a sealed condition relative to one another, pressure sensitive means for holding the first and second parts in the sealed condition when in use the fluid pressure within said passage means is below a certain value and for allowing the first and second parts to move relative to one another to a pressure relief condition in which fluid can escape from the passage means when in use the fluid pressure within said passage means exceeds said certain value, and means preventing total separation of the first and second parts when the pressure sensitive means allows the first and second parts to move relative to one another.

Preferably, said pressure sensitive means comprises frangible means breakable when the fluid pressure within said passage means exceeds said certain value.

Preferably, the first part comprises an outer component mounted on the second part for slidable movement relative thereto between a first position when the first and second parts are in said sealed condition and a second position when the first and second parts are in said pressure relief condition, and an inner component which sealingly engages the second part when the first and second parts are in said sealed condition.

Preferably, the outer component is in the form of a sleeve and has a plurality of apertures therein to enable fluid escaping from the passage means to be dispersed. In this case, a shroud may be provided on the sleeve to surround the apertures.

Preferably, the through flow coupler further comprises means releasably connecting the outer and inner components of the first part.

Preferably, the separation preventing means comprises a first projection fixed with respect to the outer component of the first part and a second projection fixed with respect to the second part. In this case, preferably, the pressure sensitive means is supported with respect to one of the first and second parts and co-operates with the projection on the other of the first and second parts to hold the two parts in said sealed condition when in use the fluid pressure within the passage means is below said certain value.

As an alternative to frangible means, said pressure sensitive means may be some form of resilient, collapsible or releasable means.

Preferably, the sealing means includes an elastomeric sealing member carried by one of the two parts.

Typically, the device is in the form of a hose coupling for use in an hydraulic or pneumatic line.

According to a second aspect of the invention, there is provided a through flow coupler comprising a tubular part having a through passage therein, a sleeve mounted about, and having a portion projecting axially beyond, one end of the tubular part, means for connecting the portion of the sleeve which projects beyond said one end of the tubular part to a further tubular part which is in use sealingly engageable with the first mentioned tubular part, pressure sensitive means for preventing relative axial slidable movement of the first mentioned tubular part and the sleeve when in use fluid pressure within the through passage is below a certain value and for allowing the sleeve to slide axially relative to the first mentioned tubular part when in use the fluid pressure in the through passage exceeds said certain value, and means preventing total separation of the first mentioned tubular part and the sleeve when the pressure sensitive means allows the sleeve to slide axially relative to the tubular part, the arrangement being such that when in use the sleeve is connected to said further tubular part, the further tubular part sealingly engages with the first mentioned tubular part unless the pressure sensitive means allows the sleeve and first mentioned tubular part to slide axially relative to one another when fluid can escape between the two tubular parts and relieve pressure within the two tubular parts.

The device has particular application in mine roof supports and, therefore, in a third aspect the invention provides a mine roof support equipped with one or more couplers according to the first or second aspect of the invention.

The invention will now be more particularly described, by way of example, with reference to the accompanying drawings.

DESCRIPTION OF THE PREFERRED EMBODIMENTS

Figure 1:
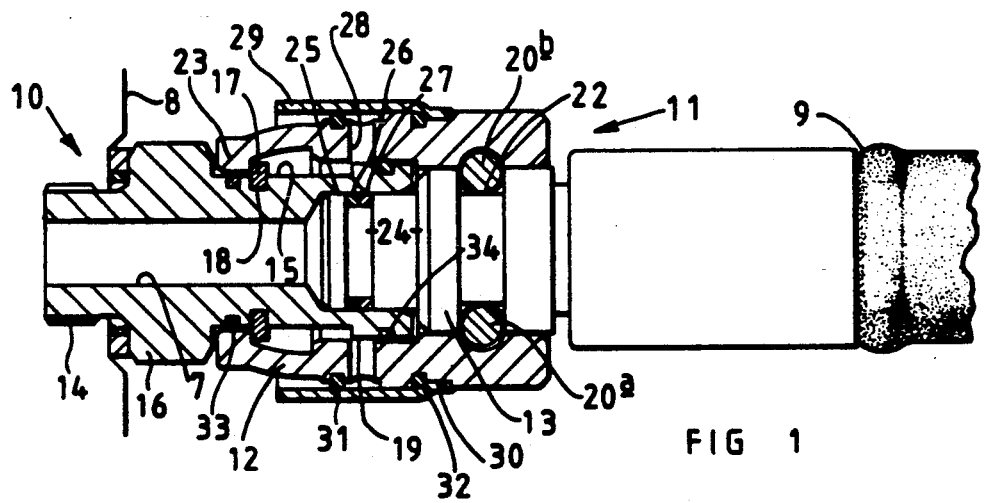
FIG. 1 is a part sectional view of one embodiment of a through flow coupler according to the present invention.

The through flow coupler shown in the drawings is provided between a prop 8 of a mine roof support and a hose 9.

The coupler comprises two parts 10 and 11 which are made of metal, e.g. mild steel. The part 10 is tubular and has a through bore 7 therein. The part 11 comprises an outer component in the form of a sleeve 12 connected to an inner tubular component 13 which also has a through bore (not shown) therein.

The part 10 has an externally threaded portion 14 for connection to an inlet/outlet port of the prop 8, a cylindrical portion 15 for receiving the sleeve 12 and a nut portion 16 between the portions 14 and 15 and by which the part 10 can be gripped to threadably connect the part 10 to the prop 8.

A frangible member 17 is located in an annular groove 18 provided in the cylindrical portion 15 of the part 10 adjacent to the nut portion 16 and the free end of the cylindrical portion 15 is provided with an outwardly extending projection in the form of an annular flange 19.

The sleeve 12 is releasably connected to the inner component 13 by a U-shaped spring steel staple 20 whose arms 20a and 20b enter a pair of parallel tangential holes 21 in the sleeve 12 to engage in an annular groove 22 provided in the inner component 13. The inner component 13 is thus fixed against axial movement relative to the sleeve 12 but the sleeve 12 and the inner component 13 are swivellable relative to one another.

The sleeve 12 is mounted on the cylindrical portion 15 of the part 10 and has a crimped, inwardly extending projection in the form of an annular flange 23 which normally co-operates with the frangible member 17 to hold the sleeve 12 in the position shown in FIG. 1 relative to the part 10.

The inner component 13 is connected to the hose 9 and has an end portion 24 which fits inside the bore 7 at one end of the part 10. The end portion 24 has an annular groove 25 locating elastomeric and plastics seals 26 and 27, respectively, which establish a fluid tight seal between the inner component 13 and the wall of the bore 7 in the part 10 when the sleeve 12 is in the position shown in FIG. 1. Thus, when the parts 10 and 11 are in relative positions as shown in FIG. 1 they are in a sealed condition relative to one another and fluid will flow through the bores in the two parts. Also, it will be noted that both the inner component 13 and the sleeve 12 are swivellable relative to the part 10.

Figure 4:
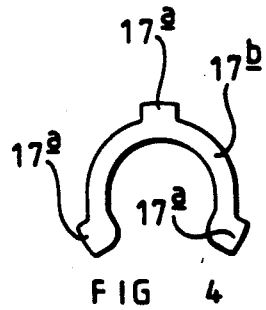
FIG. 4 is a plan view of an alternative frangible member.
Figure 3:
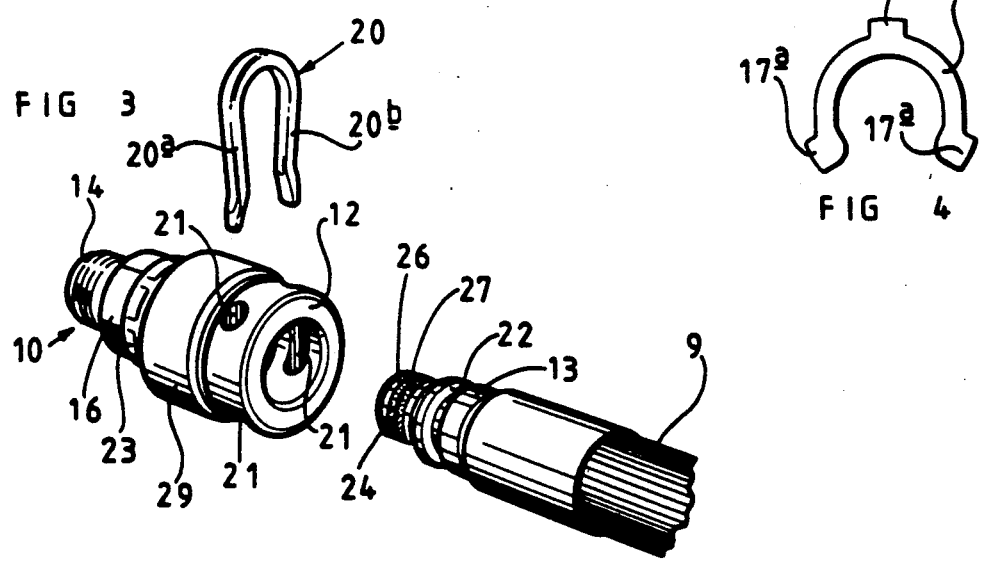
FIG. 3 is an exploded perspective view of the coupler shown in FIG. 1.

The frangible member 17 may be a split ring typically of metal alloy, such as copper alloy, brass or aluminum bronze, or of plastics material and is designed to shear when the fluid pressure within the coupler exceeds a certain value. Alternatively, as shown in FIG. 4, the frangible member 17 could be part annular, e.g. of generally horse shoe shape, and it could have a plurality of equi-angularly spaced, outwardly projecting lugs 17a which co-operate with the crimped flange 23 and which shear away from the body 17b of the frangible member when fluid pressure within the coupler reaches a certain value. Also, the ring 17 could be integral with the part 10, and in this case it could be in the form of an interrupted ring.

Figure 2:
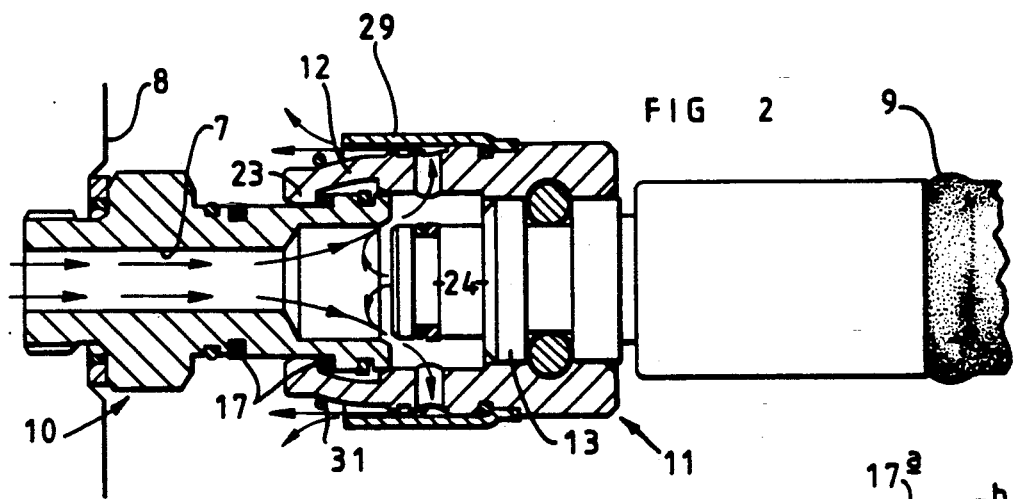
FIG. 2 is a view similar to FIG. 1 but shows the coupler after the frangible ring has sheared.

Fluid pressure within the coupler is transmitted to the frangible member 17 by the sleeve 12. If the pressure in the coupler exceeds a certain value, the frangible member 17 will shear and the parts 10 and 11 will adopt a pressure relief condition relative to one another as shown in FIG. 2. To achieve this condition, the inner component 13 of the part 11 moves out of the bore 7 of the part 10 and the sleeve 12 slides along the cylindrical portion 15 of the part 10 until the flange 23 on the sleeve 12 co-operates with the flange 19 on the part 10 to prevent total separation of the two parts 10 and 11. This is important because if the parts 10 and 11 were to separate completely the hose 9 connected to the part 11 could flail about and injure an operative in the vicinity of the coupler.

When the two parts 10 and 11 are in the pressure relief condition described above, fluid within the coupler escapes between the part 11 and the inner component 13 and the escaping fluid is dispersed through a plurality of angularly spaced, radially extending apertures 28 provided in the sleeve 12 intermediate the ends thereof.

The apertures 28 are surrounded by a generally cylindrical shroud 29 which is located at one end in a shallow groove 30 formed in the sleeve 12. O-ring seals 31 and 32 provided between the sleeve 12 and the shroud 29 prevent the ingress of dirt to the apertures 28 during normal operation of the coupler, and in the event that the ring 17 shears, the O-ring seal 30 will blow out and fluid will be safely dispersed between the sleeve 12 and the shroud 29 towards the prop 8, as shown by arrows in FIG. 2. Further seals 33 and 34 are provided between the part 10 and the sleeve 12.

The coupler described above has been purposely designed for use in mine roof supports and in particular to connect a hose 9 to the annulus of a prop 8 which is used to raise a roof engageable canopy relative to a floor engaging base section, and ideally the coupler is interchangeable with an existing coupler so that it can be fitted to existing roof supports without difficulty. However, the coupler described above has many other applications.

The inner component 13 may already exist particularly when supplying replacements parts, in which case it will be necessary to supply only part 10 fitted with the sleeve 12.

The frangible member could be replaced by some form of resilient means, e.g. Belville washers, or by a collapsible sleeve disposed between flanges 19 and 23 or by some form of releasable means, such as a circlip which will pop out of a locating groove when the fluid pressure exceeds a certain value.

Also, the crimped flange 23 could be replaced by a spring steel ring located in an annular groove in the inner surface of the sleeve 12. In this case, it may be necessary to interpose a metal washer between the spring steel ring and the frangible member 17, particularly if the latter is of plastics material, to prevent radial compression of one side of the frangible member caused by applying a sideways force to the hose. In the example described above, this is prevented by contact between flange 23 and seal 33, and between sleeve 12 and the seal 34 in flange 19.

Various other modifications could be made to the coupler described above by persons skilled in the art without departing from the scope of the invention as defined in the appended claims.

What I claim is:

1. A through flow coupler comprising first and second parts having intercommunicating passage means so that fluid can flow through the first and second parts, sealing means for providing a fluid tight seal between the first and second parts when the first and second parts are held in a sealed condition relative to one another, pressure sensitive means for holding the first and second parts in the sealed condition when in use the fluid pressure within said passage means is below a certain value and for allowing the first and second parts to move relative to one another to a pressure relief condition in which fluid can escape from the passage means when in use the fluid pressure within said passage means exceeds said certain value, and means preventing total separation of the first and second parts when the pressure sensitive means allows the two parts to move relative to one another.

2. A through flow coupler as claimed in claim 1, wherein the pressure sensitive means comprises frangible means breakable when the fluid pressure within said passage means exceeds said certain value.

3. A through flow coupler as claimed in claim 1, wherein the first part comprises an outer component mounted on the second part for slidable movement relative thereto between a first position when the first and second parts are in said sealed condition and a second position when the first and second parts are in said pressure relief condition, and an inner component which sealingly engages the second part when the first and second parts are in said sealed condition.

4. A through flow coupler as claimed in claim 3, wherein the outer component is in the form of a sleeve and has a plurality of apertures therein to enable fluid escaping from the passage means to be dispersed.

5. A through flow coupler as claimed in claim 4, wherein a shroud is provided on the sleeve to surround the apertures.

6. A through flow coupler as claimed in claim 3, further comprising means releasably connecting the outer and inner components of the first part.

7. A through flow coupler as claimed in claim 3, wherein the separation preventing means comprises a first projection fixed with respect to the outer component of the first part and a second projection fixed with respect to the second part.

8. A through flow coupler as claimed in claim 7, wherein the pressure sensitive means is supported with respect to one of the first and second parts and cooperates with the projection on the other of the first and second parts to hold the two parts in said sealed condition when in use the fluid pressure within the passage means is below said certain value.

9. A through flow coupler comprising a tubular part having a through passage therein, a sleeve mounted about, and having a portion projecting axially beyond, one end of the tubular part, means for connecting the portion of the sleeve which projects beyond said one end of the tubular part to a further tubular part which is sealingly engageable with the first mentioned tubular part, pressure sensitive means for preventing relative axial slidable movement of the first mentioned tubular part and the sleeve when in use fluid pressure within the through passage is below a certain value and for allowing the sleeve to slide axially relative to the first mentioned tubular part when in use the fluid pressure in the through passage exceeds said certain value, and means preventing total separation of the tubular part and the sleeve when the pressure sensitive means allows the sleeve to slide axially relative to the first mentioned tubular part, the arrangement being such that when in use the sleeve is connected to said further tubular part, the further tubular part sealingly engages with the first mentioned tubular part unless the pressure sensitive means allows the sleeve and first mentioned tubular part to slide axially relative to one another when fluid can escape between the two tubular parts and relieve pressure within the two tubular parts.

10. A through flow coupler as claimed in 9, wherein the sleeve and first-mentioned tubular part are swivellable relative to one another.

11. A through flow coupler as claimed in claim 9, wherein said connecting means comprises a U-shaped member having two arms which enter a pair of parallel tangential holes in the sleeve to in use engage a groove in the further tubular part.

12. A mine roof support equipped with a through flow coupler comprising first and second parts having intercommunicating passage means so that fluid can flow through the first and second parts, sealing means for providing a fluid tight seal between the first and second parts when the first and second parts are held together, pressure sensitive means for holding the first and second parts together when in use the fluid pressure within said passage means is below a certain value and for allowing the first and second parts to move relative to one another so that fluid can escape from the passage means and relieve pressure therein when in use the fluid pressure within said passage means exceeds said certain value, and means preventing total separation of the first and second parts when the pressure sensitive means allows the two parts to move relative to one another.

* * * * *